United States Patent [19]
Gray et al.

[11] Patent Number: 6,103,315
[45] Date of Patent: Aug. 15, 2000

[54] METHOD FOR MODIFYING THE SURFACE OF A THERMAL BARRIER COATING BY PLASMA-HEATING

[75] Inventors: Dennis Michael Gray, Delanson, N.Y.; Wayne Charles Hasz, Pownal, Vt.; Timothy Francis Bethel, Ballston Lake, N.Y.; Curtis Alan Johnson, Schenectady, N.Y.; Marcus Preston Borom, Niskayuna, N.Y.

[73] Assignee: General Electric Co., Schenectady, N.Y.

[21] Appl. No.: 09/058,938

[22] Filed: Apr. 13, 1998

[51] Int. Cl.$^7$ ..................................................... C23C 4/18
[52] U.S. Cl. ........................ 427/454; 427/453; 427/535; 427/539
[58] Field of Search .................................. 427/453, 454, 427/535, 539, 446

[56] References Cited

U.S. PATENT DOCUMENTS 5,455,079  10/1995  Oden et al. .............................. 427/450

OTHER PUBLICATIONS

"Characterization of Laser Glazed Plasma Sprayed Yttria Stabilized Zirconia Coatings", by H.L. Tsai, P.C. Tsai & D.C. Tu, Materials Science and Engineering, A161 (1993) 145–155. (no month date).

"Laser Surface Sealing and Strengthening of Zirconia Coatings", by A. Petitbon, L. Boquet & D. Delsart, Surface and Coatings Technology, 49 (1991) 57–61 (no month date).

Primary Examiner—Katherine A. Bareford
Attorney, Agent, or Firm—Noreen C. Johnson; Douglas E. Stoner

[57] ABSTRACT

A method for providing a substantially-smooth protective coating on a metal-based substrate is disclosed. A thermal barrier coating is first applied over the substrate by plasma-spraying. The coating is then plasma-heated according to a time- and temperature schedule sufficient to re-melt its surface region, allowing the coating material to flow and smoothen. The surface region is then allowed to cool to a temperature below its melting point. After being cooled, the surface is much smoother than when originally applied, which allows the coating to be used in a higher-temperature environment. The coating is often zirconia-based, e.g., yttria-stabilized zirconia.

18 Claims, 1 Drawing Sheet

METHOD FOR MODIFYING THE SURFACE OF A THERMAL BARRIER COATING BY PLASMA-HEATING

TECHNICAL FIELD

This invention relates generally to protective coatings applied to metals. More specifically, it is directed to modifying the surface of such coatings, to beneficially alter some of their properties, such as heat transfer characteristics.

BACKGROUND OF THE INVENTION

Thermal barrier coatings (TBCs) are often used to improve the efficiency and performance of metal parts which are exposed to high temperatures. Aircraft engines and land-based turbines are made from such parts. The combustion gas temperatures present in turbines are maintained as high as possible for operating efficiency. Turbine blades and other elements of the engine are usually made of alloys which can resist the high temperature environment, e.g., superalloys, which have an operating temperature limit of about 1000° C.–1150° C. Operation above these temperatures may cause the various turbine elements to fail and damage the engine.

The thermal barrier coatings effectively increase the operating temperature of the turbine by maintaining or reducing the surface temperature of the alloys used to form the various engine components. Most thermal barrier coatings are ceramic-based, e.g., based on a material like zirconia (zirconium oxide), which is usually chemically stabilized with another material such as yttria. For a turbine, the coatings are applied to various surfaces, such as turbine blades and vanes, combustor liners, and combustor nozzles. Usually, the thermal barrier coating ceramics are applied to an intervening bond layer which has been applied directly to the surface of the metal part.

The thermal barrier coatings are often applied to the part by a thermal spray technique, such as a plasma spray process. In this technique, an electric arc is typically used to heat various gasses, such as air, oxygen, nitrogen, argon, helium, or hydrogen, to temperatures of about 8000° C. or greater. (When the process is carried out in an air environment, it is often referred to as air plasma spray or "APS".) The gasses are expelled from an annulus at high velocity, creating a characteristic thermal plume. Powder material (e.g., the zirconia-based composition) is fed into the plume, and the melted particles are accelerated toward the substrate being coated. For some applications, plasma-spray techniques have numerous advantages over other coating techniques, such as electron beam physical vapor deposition (EB-PVD). As an example, plasma spray systems are usually less costly than EB-PVD. Moreover, they are well suited for coating large parts, with maximum control over the thickness and uniformity of the coatings.

Despite the advantages associated with plasma-sprayed thermal barrier coatings, the use of these processes can present some problems under various circumstances. For example, a plasma-sprayed coating often has a relatively rough surface, e.g., an "$R_a$" (arithmetic roughness average) value greater than about 600 micro-inches. Much smoother surfaces are required when the coating is to be applied to turbine components like airfoils, so that the convective component of the heat flux delivered to the coating can be reduced. Moreover, the aerodynamic drag losses can be also be reduced.

The thermal barrier coating surface can be smoothed by several techniques, such as grinding, tumbling, or heavy-sanding operations. However, these processes can be very time-consuming, adding considerably to the overall cost of fabrication. Moreover, they can sometimes mechanically damage the thermal barrier coating. For example, a sand-tumbling operation can sometimes result in the preferential smoothing/wearing of certain areas of the coating. The decreased thickness in those areas can undesirably lower the thermal resistance of the thermal barrier coating. Grinding, on the other hand, can induce stresses in the coating, thereby reducing its service life.

Surface-smoothing processes for thermal barrier coatings have been practiced in the art. For example, H. L. Tsai et al describe the use of a continuous wave laser to glaze the surface layer of a plasma-sprayed coating based on yttria-stabilized zirconia (Materials Science and Engineering, A161 (1993), 145–155). The process is said to be capable of producing shiny surfaces of low roughness. However, a laser system can be a considerable capital investment, adding to the cost and complexity of the overall thermal barrier coating process. Moreover, it may sometimes be quite difficult to adjust the wavelength of the laser to melt the most appropriate surface-portion of the thermal barrier coating, i.e., a layer thick enough to form a smooth surface, but thin enough to preserve the overall integrity of the protective coating.

From this discussion, it should be apparent that new methods for modifying the surface of a thermal barrier coating would be welcome in the art. The new processes should smooth the surface to a degree suitable for aerodynamic applications, while maintaining all of the beneficial characteristics of the coating. Moreover, the processes should be fully compatible with the application of the thermal barrier coating over a substrate, and should not add excessive cost or time to the overall production operation.

SUMMARY OF THE INVENTION

This invention is directed to improvements in the state-of-the art presented above. In one aspect, the invention embraces a method for providing a substantially-smooth protective coaling on a metal-based substrate, comprising the steps of:

(a) applying a thermal barrier coating over the substrate by plasma-spraying;

(b) plasma-heating the applied coating according to a time- and temperature schedule sufficient to re-melt the surface region of the coating, allowing it to flow and smoothen; and then (c) allowing the surface region to cool to a temperature below its melting point.

The thermal barrier coating is often zirconia-based, e.g., yttria-stabilized zirconia, and may be applied over a conventional bond coat layer. After the thermal barrier coating has been applied, the action of the plasma torch, without coating particles being directed therethrough, can be controlled to re-melt a surface region of the thermal barrier coating. The affected region usually has a thickness in the range of about 1 micron to about 100 microns. After being cooled, the surface is much smoother than when originally applied, having a surface roughness (Ra) of less than about 250 micro-inches. The modified surface beneficially reduces the amount of heat transfer into the thermal barrier coating, thereby allowing the coating to be used in a higher-temperature environment. The modified surface also reduces aerodynamic losses. In the case of substrates which are part of turbines, the aerodynamic enhancement results in higher turbine efficiency.

Other details regarding the various embodiments of this invention are provided below.

DETAILED DESCRIPTION OF THE INVENTION

Figure 1:
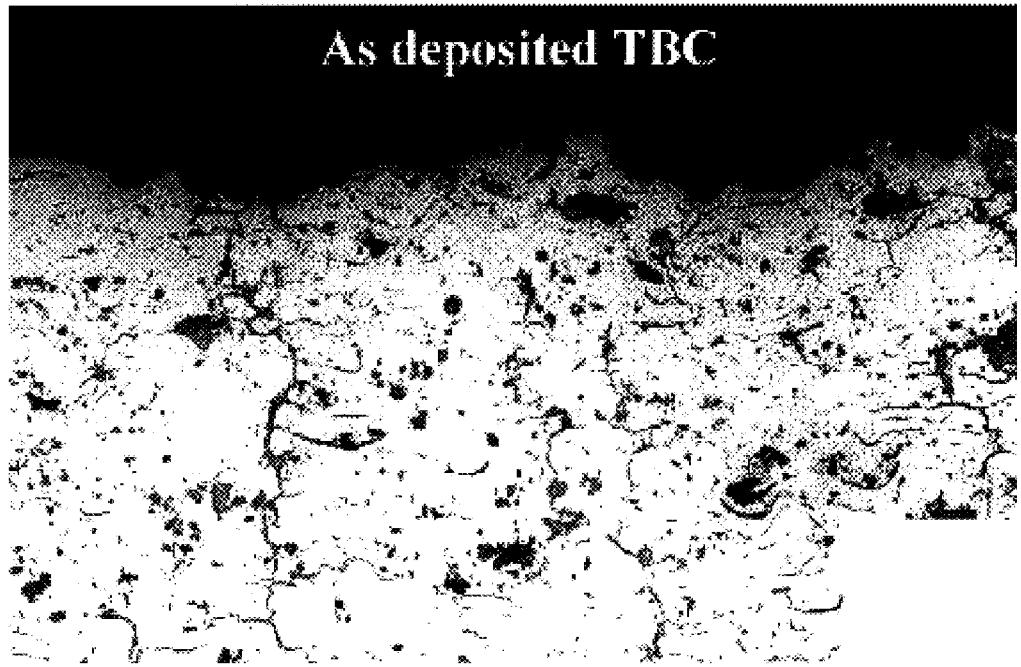
FIG. 1 is a photomicrograph of a cross-section of a thermal barrier coating applied to a metallic bond coat on top of a superalloy substrate.

A variety of materials can be used for the thermal barrier coating of this invention. In preferred embodiments, the coating is zirconia-based. Zirconia is a well-known compound for barrier coatings, and is described, for example, in Kirk-Othmer's *Encyclopedia of Chemical Technology*, 3rd Edition, V. 24, pp. 882–883 (1984). In preferred embodiments, the zirconia is chemically stabilized by being blended with a material such as yttrium oxide (yttria), calcium oxide, magnesium oxide, cerium oxide, scandium oxide, or mixtures of any of those materials. In one specific example, zirconia can be blended with about 1% by weight to about 20% by weight yttria (based on their combined weight), and preferably, from about 3%–10% yttria.

The substrate can be any metallic material or alloy which is typically protected by a thermal barrier coating. Often, the substrate is a heat-resistant alloy, e.g., a superalloy. Such materials are described in various references, such as U.S. Pat. Nos. 5,399,313 and 4,116,723, both incorporated herein by reference. High temperature alloys are also generally described in Kirk-Othmer's *Encyclopedia of Chemical Technology*, 3rd Edition, Vol. 12, pp. 417–479 (1980), and Vol. 15, pp. 787–800 (1981). Illustrative nickel-based alloys are designated by the trade-names Inconel®, Nimonic®, Rene® (e.g., Rene® 80-, Rene® 95 alloys), and Udimet®. As mentioned above, the type of substrate can vary widely, but it is often in the form of a turbine part, such as an airfoil component.

It is often desirable to apply a bond coat between the substrate and the thermal barrier coating to enhance adhesion to the substrate. The bond coat is usually formed from a material like "MCrAlY", where "M" represents a metal like iron, nickel, or cobalt. It may be applied by a variety of conventional techniques, such as PVD; plasma spray or other thermal spray deposition methods such as HVOF (high velocity oxy-fuel), detonation, or wire spray; CVD (chemical vapor deposition); or combinations of plasma spray and CVD techniques. In some preferred embodiments, a plasma spray technique, such as that used for the thermal barrier coating, is employed to deposit the bond coat layer. Usually, the bond coat has a thickness in the range of about 25 microns to about 500 microns, and preferably, in the range of about 125 microns to about 375 microns.

Various types of plasma-spray techniques may be utilized to apply the thermal barrier coating of the present invention. They are generally well-known in the art, e.g., see the Kirk-Othmer *Encyclopedia of Chemical Technology*, 3rd Edition, V. 15, page 255, and references noted therein. U.S. Pat. Nos. 5,332,598; 5,047,612 (Savkar and Lillquist); and U.S. Pat. No. 4,741,286 are instructive in regard to various aspects of plasma spraying, and are incorporated herein by reference. In general, the typical plasma spray techniques involve the formation of a high-temperature plasma, which produces a thermal plume. The coating material, e.g., zirconia powder, is fed into the plume, and the high-velocity plume is directed toward the substrate. In preferred embodiments, an air plasma spray technique is used.

Those of ordinary skill in the plasma spray coating art are familiar with various details which are relevant to applying the coating. Examples of the various relevant steps and process parameters include: Cleaning of the surface prior to deposition; grit blasting to remove oxides and roughen the surface; substrate temperature; plasma spray parameters such as spray distances (gun-to-substrate), selection of the number of spray-passes, powder feed rate, particle velocity, torch power, plasma gas selection, oxidation control to adjust oxide stoichiometry, angle-of-deposition, post-treatment of the applied coating; and the like.

Torch power may vary in the range of about 10 kilowatts to about 200 kilowatts, and in preferred embodiments, ranges from about 40 kilowatts to about 60 kilowatts.

The velocity of the zirconia particles flowing into the plasma plume (or plasma "jet") is another parameter which is usually controlled very closely. To briefly review (and as described in several of the references, e.g., U.S. Pat. No. 5,047,612), the typical plasma spray system includes a plasma gun anode which has a nozzle pointed in the direction of the deposit-surface of the substrate being coated. The plasma gun is often controlled automatically, e.g., by a robotic mechanism, which is capable of moving the gun in various patterns across the substrate surface.

The plasma plume extends in an axial direction between the exit of the plasma gun anode and the substrate surface. Some sort of powder injection means is disposed at a predetermined, desired axial location between the anode and the substrate surface. In some preferred embodiments, the powder injection means is spaced apart in a radial sense from the plasma plume region, and an injector tube for the powder material is situated in a position so that it can direct the powder into the plasma plume at a desired angle. The powder particles, entrained in a carrier gas, are propelled through the injector and into the plasma plume. The particles are then heated in the plasma and propelled toward the substrate. The particles melt, impact on the substrate, and quickly cool to form the thermal barrier coating.

The thickness of the thermal barrier coating will depend on the end use of the part being coated. Usually, the thickness is in the range of about 125 microns to about 2500 microns. In preferred embodiments for end uses such as airfoil components, the thickness is often in the range of about 250 microns to about 750 microns.

After the thermal barrier coating has been applied, it is plasma-heated according to a time- and temperature schedule sufficient to re-melt the surface region of the coating. A variety of plasma systems can be employed for this purpose. In preferred embodiments, the plasma system is that which was used to apply the thermal barrier coating. For example, the powder feed to the system could be shut off, while the plasma plume continues to be directed toward the substrate.

As used herein the term "surface region" of the coating is usually a coating thickness in the range of about 1 micron to about 100 microns. The thermal-insulating capability of the thermal barrier coating material usually prevents melting from occurring at greater depths. In general, it is preferred that melting occur through as little a region as is necessary to achieve the effect of smoothing the surface, e.g., melting a surface region having a thickness less than about 50 microns, and preferably, less than about 30 microns. (The desired melting depth will depend in part on the degree of surface roughness which was initially present.).

The temperature required to re-melt the surface region of the thermal barrier coating depends in part on the composition of the coating, i.e., the overall melting point of the composition. In the case of a yttria-stabilized zirconia-based coating, the required temperature is usually at least about 2750° C. In general, the temperature at the surface should be the minimum temperature (above the melting point) which will allow flow of the molten material. Those skilled in the art can readily determine the temperature needed for various types of thermal barrier coatings, based on available melting point data.

It is known in the art that plasma temperatures themselves, i.e., within the thermal plume, are very high, e.g., about 10,000° C. For a typical plasma system, the distance from the plasma torch to the applied coating during the re-melting step will depend on the type of plasma gun, the gun speed over the part, the power of the gun and the plasma conditions used. These distances could vary from 0.5 cm to about 17 cm and will depend on the gun and the choice of the conditions mentioned above. Adjustments in that range can be made, depending on many of the factors set forth above, e.g., torch power, torch speed, thermal barrier coating composition, and the like. Moreover, gas flow into the plasma can be adjusted to reduce the occurrence of molten surface material "splashing", which could otherwise lead to a wavy surface after cooling.

Often, the substrate surface or "target" is positioned vertically relative to the ground, and the torch is moved across the surface from left-to-right or right-to-left. The torch is indexed downwardly or upwardly, depending on what part of the surface is heated first. Torch speed will depend on many of the factors mentioned above, but usually is in the range of about 250 cm per minute to about 7600 cm per minute. A high torch speed (within this range) could be used when the distance from the torch to the coating is relatively close, while a lower torch speed could be used when the distance is greater.

After plasma-heating is stopped, the surface region of the substrate will quickly cool to a temperature below its melting point. Usually, the time required for cooling will be less than about 1 second.

As shown below in the examples, the treated surface becomes very smooth. Usually, the surface roughness will be less than about 250 micro-inches Ra after being plasma-heated. Often, the surface roughness is less than about 150 micro-inches Ra. The modified surface beneficially reduces the amount of heat transfer into the thermal barrier coating.

It should be apparent from the above discussion that another aspect of this invention is directed to a heat-resistant metal article having a plasma-smoothened surface formed from a thermal barrier coating. The surface has a roughness (Ra) of less than about 250 micro-inches, and preferably, less than about 150 micro-inches. The substrate may be formed of a superalloy material, and is sometimes covered with a bond coat which is positioned below the thermal barrier coating.

EXAMPLE

The example which follows illustrates some embodiments of this invention, and should not be construed to be any sort of limitation on its scope.

The test sample was a coupon made from a nickel-based superalloy, Rene® N-5, having a dimension of 1 inch (2.5 cm)×2 inches (5.0 cm), with a thickness of 0.125 inch (0.32 cm). Prior to deposition of the bond coat, the coupon was grit-blasted (60 grit) and then ultrasonically cleaned with an alcohol and acetone. A bond coat of the NiCrAlY-type was first applied to the coupon-substrate, using an air plasma system. The thickness of the bond coat was about 250 microns.

A thermal barrier coating (zirconia, with 8 wt. % by weight yttria) having an average thickness of about 500 microns, was then air plasma-sprayed onto the bond coat. A commercially-available Metco spray gun system, robotically controlled, was used to deposit the coatings. The substrate was positioned vertically relative to the ground, and the plasma torch was moved horizontally across the surface, and then indexed vertically, to cover the entire surface area. The deposited molten droplets solidify very shortly after contact with the deposition surface.

Surface roughness was measured by way of stylus profilometry. The measurements were taken (three times each) in the same direction as the motion of the plasma gun, and also in a direction perpendicular to that direction. The resulting measurements were then averaged.

FIG. 1 is a photomicrograph showing a cross-sectional depiction of the sample, at a magnification of 200×. The average roughness of the thermal barrier coating (Ra) was 700 micro-inches.

With the powder feed turned off, the plasma torch was again passed over the surface according to the same pattern. The torch speed was about 7100 cm per minute, and the torch-to-substrate distance was about 1.9 cm, which was sufficient to bring a portion of the thermal barrier coating material to its liquidus temperature. Re-melting within the thermal barrier coating occurred to a depth of about 25 microns. Soon after the plasma torch has moved away from the melted surface, the temperature of the surface drops below the melting temperature and the surface resolidifies.

Figure 2:
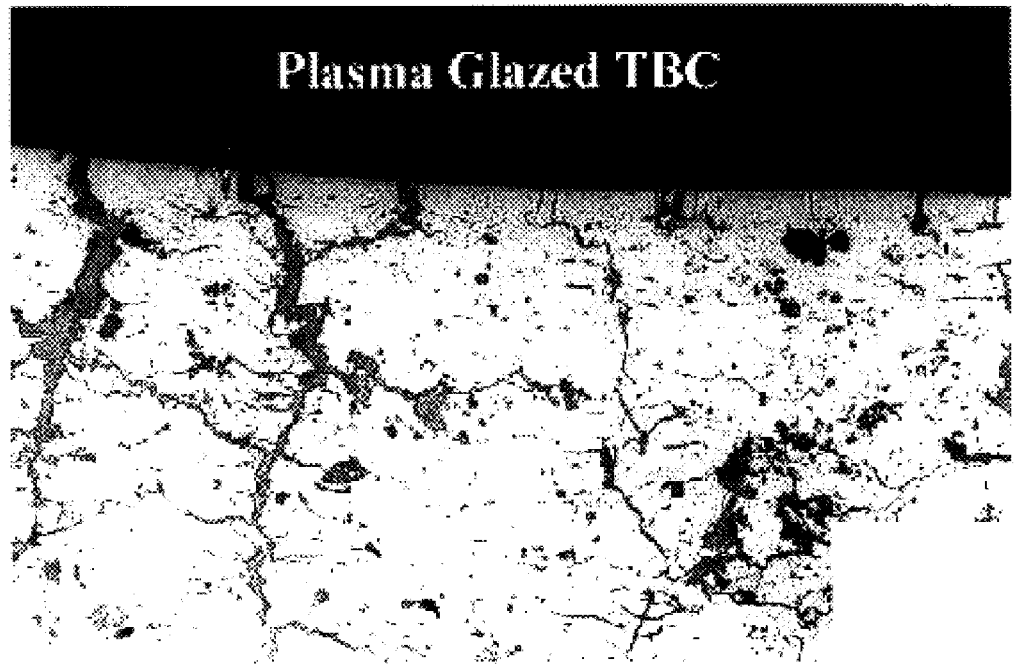
FIG. 2 is a photomicrograph of the coating of FIG. 1, after modification according to the present invention.

FIG. 2 is a photomicrograph showing a cross-sectional depiction of the sample at this stage. The smoothness of the sample surface is clear from the figure, and the measured, average roughness was less than about 120 micro-inches Ra. It should be noted that the profilometry values were sometimes influenced by the presence of vertical cracks in the coating surface. These cracks are part of the desired microstructure of the coating, and the profilometer needle registered them during traversal of the surface. If the presence of the vertical cracks is discounted, the surface roughness measurements after treatment according to this invention would have been even lower.

While preferred embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the claimed inventive concept.

All of the patents, articles, and texts mentioned above are incorporated herein by reference.

What is claimed:

1. A method for providing a substantially-smooth protective coating on a metal-based substrate, comprising the steps of:
    (a) applying a thermal barrier coating over the substrate by plasma-spraying;
    (b) plasma-heating the applied coating according to a time- and temperature schedule sufficient to re-melt the surface region of the coating, allowing it to flow and smoothen, said surface region having a thickness in the range of about 1 micron to about 100 microns; and then
    (c) allowing the surface region to cool to a temperature below its melting point.

2. The method of claim 1, wherein the thermal barrier coating is zirconia-based.

3. The method of claim 2, wherein the thermal barrier coating comprises yttria-stabilized zirconia.

4. The method of claim 2, wherein the plasma-heating temperature of step (b) is at least about 2750° C.

5. The method of claim 1, wherein an air-plasma technique is used in steps (a) and (b).

6. The method of claim 5, wherein gasses are expelled from a torch to form the plasma, and wherein the distance from the torch to the applied coating in step (b) is maintained in the range of about 0.5 cm to about 17 cm.

7. The method of claim 6, wherein the torch is moved over the applied coating in step (b) at an average traverse-torch speed of about 1800 cm per minute to about 7600 cm per minute.

8. The method of claim 7, wherein the torch movement is controlled by a robotic mechanism.

9. The method of claim 1, wherein the surface region has a thickness in the range of about 1 micron to about 50 microns.

10. The method of claim 1, wherein the applied coating has a surface roughness (Ra) of less than about 250 micro-inches after step (c).

11. The method of claim 10, wherein the applied coating has a surface roughness of less than about 150 micro-inches after step (c).

12. The method of claim 1, wherein a metallic bond layer is applied on the substrate prior to the application of the thermal barrier coating.

13. The method of claim 12, wherein the bond layer is applied by a thermal spray technique.

14. The method of claim 13, wherein the thermal spray technique is an air plasma spray process.

15. The method of claim 1, wherein the substrate is a nickel-based superalloy.

16. A process for preparing a metal article which is resistant to high temperature, comprising the steps of:

(i) applying a thermal barrier coating over the substrate with an air-plasma spray device which propels barrier coating particles onto the substrate;

(ii) plasma-heating the thermal barrier coating with the air-plasma spray device without propelling barrier coating particles, according to a time- and temperature schedule sufficient to re-melt the surface region of the coating, allowing it to flow and smoothen, said surface region having a thickness in the range of about 1 micron to about 100 microns and then (iii) allowing the surface region to cool to a temperature below its melting point.

17. The process of claim 16, wherein a metallic bond layer is applied on the substrate prior to the application of the thermal barrier coating.

18. The process of claim 16, wherein the thermal barrier coating comprises yttria-stabilized zirconia.

* * * * *